(12) United States Patent
Ge

(10) Patent No.: US 7,880,897 B2
(45) Date of Patent: Feb. 1, 2011

(54) LIGHT WAVE INTERFEROMETER APPARATUS

(75) Inventor: Zongtao Ge, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 182 days.

(21) Appl. No.: 12/334,034

(22) Filed: Dec. 12, 2008

(65) Prior Publication Data

US 2009/0168076 A1 Jul. 2, 2009

(30) Foreign Application Priority Data

Dec. 28, 2007 (JP) ............................ P2007-340136
Feb. 8, 2008 (JP) ............................ P2008-029531

(51) Int. Cl.
*G01B 9/02* (2006.01)
(52) U.S. Cl. ..................................... 356/513
(58) Field of Classification Search ................ 356/511, 356/512, 513, 515

See application file for complete search history.

(56) References Cited

U.S. PATENT DOCUMENTS

| 4,743,117 | A | * | 5/1988 | Kitabayashi et al. | ........ | 356/520 |
| 5,940,181 | A | * | 8/1999 | Tsubono et al. | ............. | 356/508 |
| 6,956,657 | B2 | | 10/2005 | Golini et al. | | |
| 2003/0011783 | A1 | * | 1/2003 | Suzuki et al. | ............... | 356/512 |
| 2005/0083537 | A1 | * | 4/2005 | Kuchel | ........................ | 356/513 |
| 2009/0168075 | A1 | * | 7/2009 | Yamazoe et al. | ............ | 356/511 |
| 2009/0284753 | A1 | * | 11/2009 | Neal et al. | .................... | 356/512 |
| 2009/0296101 | A1 | * | 12/2009 | Oshima et al. | .............. | 356/512 |
| 2010/0149547 | A1 | * | 6/2010 | Nakauchi | ..................... | 356/513 |
| 2010/0177322 | A1 | * | 7/2010 | Nakauchi | ..................... | 356/512 |

FOREIGN PATENT DOCUMENTS

| DE | 102005021783 A1 | 11/2006 |
| JP | 08-146018 A | 6/1996 |
| JP | 2001-133244 A | 5/2001 |
| JP | 2004-532990 A | 10/2004 |
| WO | WO-03/01143 A2 | 1/2003 |

OTHER PUBLICATIONS

Office Action in Chinese Application No. 200810185513.9 mailed Jul. 1, 2010, including an English translation.

* cited by examiner

*Primary Examiner*—Patrick J Connolly
(74) *Attorney, Agent, or Firm*—Birch, Stewart, Kolasch & Birch, LLP

(57) ABSTRACT

The light wave interferometer apparatus is provided and includes: a luminous flux, which is sent from the light source and divided into two portions by the luminous flux separation and composition unit, are combined with each other again under the condition that the divided luminous fluxes hold wavefront information corresponding to the surface shapes of the aspherical lens to be inspected and the reference aspherical lens by the respectively corresponding basis spherical lenses. Therefore, a wavefront difference of the aspherical lens to be inspected with respect to the reference aspherical lens is made to be interference fringe information and formed on an image pickup plane of the interferometer CCD camera. The basis spherical lenses have the basis spherical surfaces, the curvatures of which are equal to each other.

5 Claims, 3 Drawing Sheets

LIGHT WAVE INTERFEROMETER APPARATUS

The present invention claims priority from Japanese Patent Application No. 2007-340136 filed on Dec. 19, 2007, and No. 2008-029531 filed on Feb. 20, 2008, the entire content of which is incorporated herein by reference.

BACKGROUND OF INVENTION

1. Field of the Invention

The present invention relates to a light wave interferometer apparatus, especially which is used for measuring an aspherical surface shape of an aspherical lens.

2. Description of the Related Art

Recently, there is a strong demand for measuring an aspherical surface shape of an aspherical optical element with high accuracy, especially in the field of designing and manufacturing lenses.

Concerning the technique related to a measurement method of measuring an aspherical shape with high accuracy, in the Fizeau type interferometer, a reflection element for reference having an aspherical surface for reference, which is a basis used for measuring an aspherical surface to be measured, is arranged close to the aspherical surface to be measured. According to interference fringes obtained by light interference of a reference light, which reflects on the reflection element for reference and returns to the aspherical surface to be measured, with object light, which reflects on the aspherical surface to be measured and a shape of the aspherical surface to be measured is measured. At the time of this measurement, interference fringes are scanned. A so-called interference fringes scanning method is known (JP-A-2004-532990).

Further, concerning the technique related to a measurement method of measuring an aspherical surface shape with high accuracy, a so-called spot scanning method, which is disclosed in JP-A-8-146018 and JP-A-2001-133244, is known. Furthermore, a measurement method described in U.S. Pat. No. 6,956,657, in which a synthetic aperture method is used, is known.

However, in the method described in JP-A-2004-532990 and others, the measurement is greatly affected by a dislocation between the optical axis of the aspherical surface for reference (the basis aspherical surface) and that of the aspherical surface to be measured. Therefore, it is impossible to obtain excellent interference fringes with respect to all regions of the aspherical surface shape to be inspected at the same time. After all, in order to obtain the information of interference fringes with respect to the whole surface to be inspected, it is necessary to repeat image-pickup each time the information of interference fringes appears in each region. Further, it is necessary to combine a large number of pieces of information of interference fringes with each other. Therefore, operation of obtaining the information of interference fringes becomes very complicated.

Accordingly, it takes a very long measurement time to execute the methods described above.

Further, in the case of JP-A-2004-532990, a manufacturing cost of the apparatus is expensive. In the case of U.S. Pat. No. 6,956,657, a structure of the apparatus becomes complicated.

SUMMARY OF INVENTION

An object of an exemplary embodiment of the invention is to provide a light wave interferometer apparatus, which is capable of simply measuring a surface shape of an aspherical optical element at a low production cost in a short period of time.

According to a first aspect of the invention, a light wave interferometer apparatus includes: a luminous flux separation and composition unit that separates a luminous flux sent from a light source into two of a first luminous flux going in a direction of a measured sample having a surface shape to be measured and a second luminous flux going in a direction of a reference sample and composes a light of the first luminous flux returning from the measured sample with a light of the second luminous flux returning from the reference sample so as to generate an interference light which forms an interference fringe image on an imaging body arranged at a position based on information of a surface shape of the measured sample; a first basis spherical lens arranged between the luminous flux separation and composition unit and the measured sample and having a first basis spherical surface opposed to the measured sample, the first basis spherical lens making the first luminous flux from the luminous flux separation and composition unit incident on a surface of the measured sample and returning the first luminous flux reflected on the surface of the measured sample to the luminous flux separation and composition unit; and a second basis spherical lens arranged between the luminous flux separation and composition unit and the reference sample and having a second basis spherical surface opposed to the reference sample, wherein a radius of curvature of the second basis spherical surface is the same as that of the first basis spherical surface, the second basis spherical lens making the second luminous flux from the luminous flux separation and composition unit incident on a surface of the reference sample and returning the second luminous flux reflected on the surface of the reference sample to the luminous flux separation and composition unit, wherein the measured sample is an aspherical optical element, and the reference sample is an aspherical optical element and has a reference shape of the measured sample.

According to a second aspect of the invention, the light wave interferometer apparatus is a Michelson type interferometer apparatus, wherein optical path lengths of the first luminous flux and the second luminous flux are substantially equal to each other.

According to a third aspect of the invention, the luminous flux separation and composition unit has a separation surface on one side thereof, which separates and composes the first and second luminous fluxes by a reflection and a transmission of the first and second luminous fluxes and, wherein the luminous flux separation and composition unit has a plate shape, a cross-section of which has a wedge shape.

According to a fourth aspect of the invention, the light wave interferometer apparatus includes: a compensating plate that compensates a difference in optical path length between the first luminous flux and the second luminous flux, and which is positioned in an optical path of one of the first or the second luminous fluxes emitted onto one side of the luminous flux separation and composition unit and positioned between the one of the basis spherical lens and the luminous flux separation and composition unit in the optical path.

According to a fifth aspect of the invention, the light wave interferometer apparatus includes a deformable mirror attached onto a surface of the reference sample.

In this connection, the above basis spherical surface is a spherical surface which is a base of the aspherical surface of the above reference body. That is, the above basis spherical surface is a spherical surface, the curvature (or the radius of curvature) of which is a value of the curvature C (or the radius of curvature R) in the case where the above aspherical surface is expressed by a well known aspherical surface formula.

According to a sixth aspect of the invention, a light wave interferometer apparatus includes: a luminous flux separation and composition unit that separates a luminous flux sent from a light source into two of a first luminous flux going in a direction of a measured sample which is an aspherical optical element having a surface shape to be measured and a second luminous flux going in a direction of a reference sample as a reference body and composes a light of the first luminous flux returning from the measured sample with a light of the second luminous flux returning from the reference sample so as to make an interference light which forms an interference fringe image on an imaging body arranged at a position based on information of a surface shape of the measured sample; a variable lens that is arranged between the luminous flux separation and composition unit and the measured sample and that changes a wavefront shape of the first luminous flux output from the variable lens, wherein the first luminous flux output from the luminous flux separation and composition unit is incident at each surface position of the measured sample at an angle and an inspected light reflected at each position on the surface position of measured sample is returned to the luminous flux separation and composition unit; an adjustment member that sends the variable lens a wavefront control signal for changing a refractive power distribution of the variable lens, wherein the variable lens changes the wavefront shape of the output first luminous flux according to the wavefront control signal so that an interference fringe of the interference light becomes a null fringe on the imaging body; and a lens shape calculating unit that calculates a surface shape of the measured sample according to the wavefront control signal sent to the variable lens when the interference fringe is changed into the null fringe.

According to a seventh aspect of the invention, the luminous flux separation and composition unit is a basis plate of a Fizeau type, which has a basis surface on one side surface thereof for separating the luminous flux from the light source into the first and the second luminous fluxes.

In this connection, the above clause "according to the wavefront control signal which is sent to the wavefront shape variable lens when the interference fringe is changed into the null fringe" includes not only a case of "only according to the output signal value at the time of becoming the null fringe" but also a case of "according to the output signal value from the point of a predetermined time to the point of time of becoming the null fringe.

In this connection, the above word "null fringe" is referred to as a state in which no fringes exist on the interference image plane of the measurement region. Concerning this matter, refer to JCSS Uncertainty Estimation Guide (Flatness) revised on April, 2007.

In a light wave interferometer apparatus of the present invention, a luminous flux sent from a light source is divided into two portions by a luminous flux separation and composition unit. One portion of the luminous flux is a first luminous flux and the other portion of the luminous flux is a second luminous flux. The first luminous flux reflected on a body to be inspected and the second luminous flux reflected on a reference body are composed with each other by the luminous flux separation and composition unit. Due to the foregoing, the surface shape information of the body to be inspected may be obtained as interference fringe information.

The interference light, which has been composed by the luminous flux separation and composition unit in accordance with a difference between the reflection light of the first luminous flux on the surface of a body to be inspected and the reflection light of the second luminous flux on the reference body surface which is a basis of the surface shape of the body to be inspected. However, the reflection light of the first luminous flux includes information based on a difference in shape between the surface of the body to be inspected and the first basis spherical surface. This information is referred to as shape difference information, hereinafter. On the other hand, the reflection light of the second luminous flux includes information based on a difference in shape between the reference body surface and the second basis spherical surface. The interference fringes formed by the interference of both the reflection luminous fluxes are made by the above two pieces of shape difference information. Therefore, the fringe sensitivity is greatly reduced. Due to the foregoing, the interference fringes may be excellently formed on the imaging body. Further, it is possible to simultaneously obtain the interference fringe information related to all regions of the surface of a body to be inspected which is very close to an aspherical surface.

Therefore, according to a light wave interferometer apparatus of the present invention, it is possible to easily measure a surface shape of an aspherical optical element at a low production cost in a short period of time.

In a light wave interferometer apparatus of the present invention, a wavefront variable direction signal is sent to the wavefront shape variable lens so that the interference fringes formed on the imaging body may become null fringes. Further, a refractive power distribution is changed so that the shape of the wavefront of the first luminous flux outputted from the wavefront shape variable lens may be changed. According to the wavefront variable direction signal sent to the wavefront variable lens when the obtained interference fringes become null fringes, an aspherical surface shape of the body to be inspected is calculated.

The wavefront shape variable lens is configured in such a manner that the refractive power distribution is changed according to the wavefront variable direction signal sent from the adjustment member of the wavefront shape variable lens. Until the obtained interference fringes become null fringes, the wavefront variable direction signals are continuously inputted. When the obtained interference fringes have become null fringes, the first luminous flux is perpendicularly incident upon each surface position of the body to be inspected. When a wavefront shape of the first luminous flux outputted from the adjustment member of the wavefront shape variable lens at this time corresponds to the surface shape of the lens to be inspected, a surface shape of the lens to be inspected may be calculated according to the wavefront variable direction signal inputted into the wavefront shape variable lens.

Other characteristics and advantages are clear from the descriptions of the exemplary embodiment.

DESCRIPTION OF EXEMPLARY EMBODIMENTS

Figure 1:
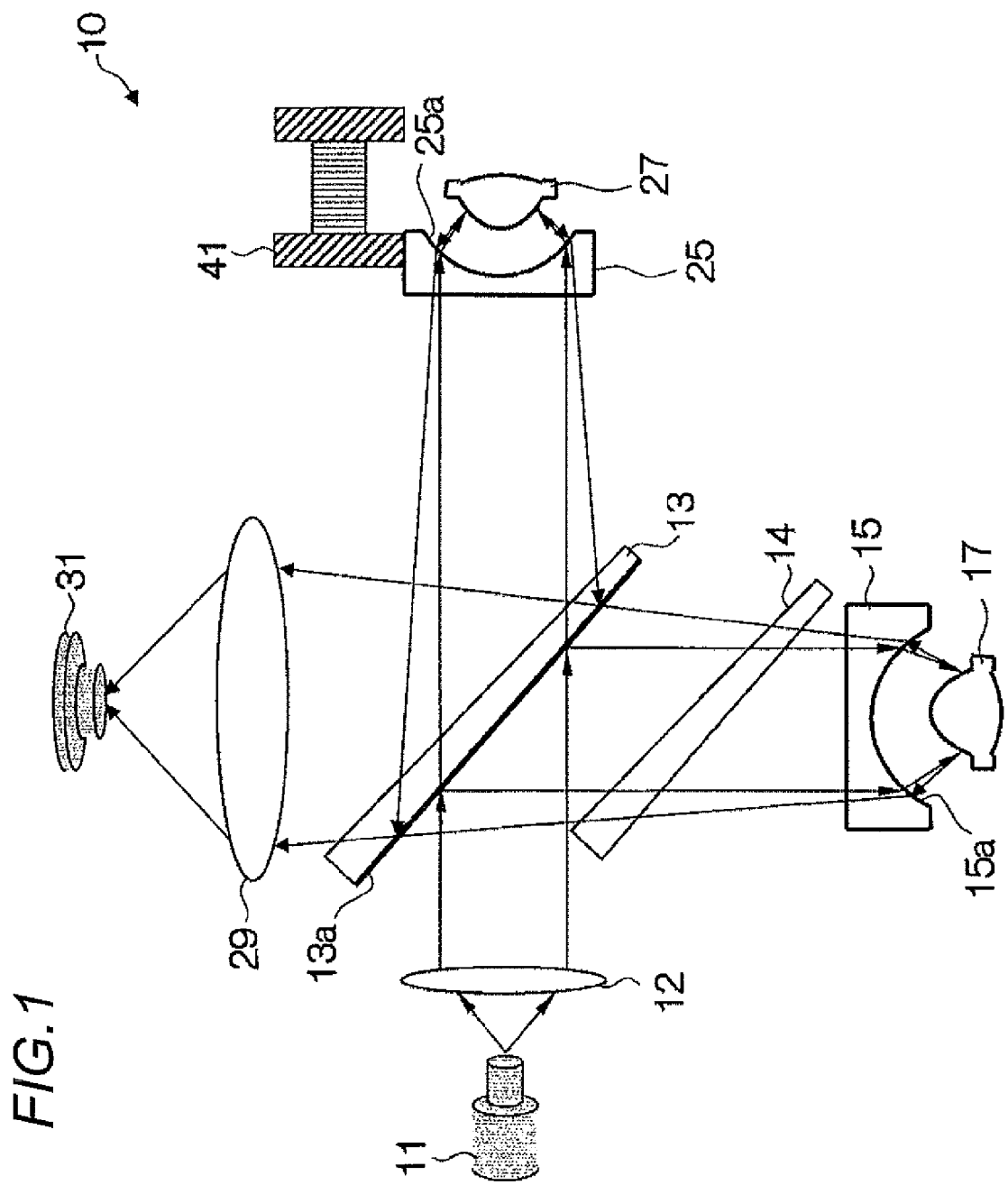
FIG. 1 is a view showing an outline of the constitution of a light wave interferometer apparatus of a first exemplary embodiment of the present invention.

Referring to the drawings, exemplary embodiments of the present invention will be explained below. FIG. 1 is a view showing an outline of the constitution of a light wave interferometer apparatus of a first exemplary embodiment of the present invention.

As shown in FIG. 1, this apparatus 10 includes:

a light source 11;

a collimate lens 12 which makes a luminous flux sent from the light source 11 into a parallel luminous flux;

a beam splitter 13 (a luminous flux separation and composition unit) which divides the parallel luminous flux sent from the collimate lens 12 into two portions by the transmission/reflection separation surface 13a;

a high NA basis spherical lens (a first basis spherical lens) 15 which illuminates the first parallel light reflected on this transmission/reflection separation surface 13a onto a aspherical lens 17 to be inspected and at the same time returns the reflected light sent from the aspherical lens 17 to be inspected to the transmission/reflection separation surface 13a;

a high NA basis spherical lens (a second basis spherical lens) 25 which illuminates the second parallel light transmitted through this transmission/reflection separation surface 13a onto a reference aspherical lens 27 and at the same time returns the reflected light sent from the reference aspherical lens 27 to the transmission/reflection separation surface 13a;

an interferometer CCD camera 31 which picks up an image of the interference fringes generated by the interference of the reflection light sent from the aspherical lens 17 to be inspected with the reflection light sent from the reference aspherical lens 27 on the transmission/reflection separation surface 13a; and an image formation lens 29 which forms an image of the interference fringes generated by both fluxes of reflection light combined with each other on image pickup plane of the interferometer CCD camera 31.

In order to prevent the generation of noise interference fringes by the reflection light sent from the surface opposite to the transmission/reflection separation surface 13a, the beam splitter 13 is composed into a wedge shape so that both surfaces, which are opposed to each other, may not be parallel with each other.

Concerning the number at which the luminous flux passes in the beam splitter 13, in the case of the first parallel luminous flux, the number is one. On the other hand, in the case of the second parallel luminous flux, the number is three. In order to correspond to optical path lengths of the luminous fluxes with each other, the compensating plate 14 is provided. The arrangement of the compensating plate 14 is in parallel with that of the beam splitter 13 and formed into the substantially same wedge shape. The wedge direction of the compensating plate 14 extends such as the length direction of the beam splitter 13.

Only the primary portions of the high NA basis spherical lens (the first basis spherical lens) 15 and the high NA basis spherical lens (the second basis spherical lens) 25 are schematically drawn. The concave surfaces are the basis spherical surfaces 15a, 25a, the radiuses of curvature of which are equal to each other.

These basis spherical surfaces 15a, 25a are composed as follows. The parallel luminous fluxes are perpendicularly emitted from the basis spherical surfaces 15a, 25a, respectively. Further, the luminous fluxes are perpendicularly incident upon a virtual spherical surface on bases of the aspherical lens 17 to be inspected and the reference aspherical lens 27. However, both surface shapes of the aspherical lens 17 to be inspected and the reference aspherical face lens 27 are aspherical. Therefore, the incident angles of the luminous flux with respect to these lenses 17, 27 are not 0 degree but some small angles are formed.

The high NA spherical basis lens 25 is attached with the piezo element 41. Therefore, it is possible to employ a well known phase shift method.

In general, the aspherical lens 17 to be inspected has a small shape difference with respect to the reference aspherical lens 27 which is the basis of the shape. This light wave interferometer apparatus 10 quantitatively measures such a shape difference of the aspherical lens 17 to be inspected.

The luminous fluxes, which are sent from the light source 11 and divided into two portions by the transmission/reflection separation surface 13a, hold wavefront information in accordance with a difference in the surface shapes of the aspherical lens 17 to be inspected and the reference aspherical lens 27 and combined with each other again by the high NA basis spherical lenses 15, 25, correspondently to the respective luminous lens. A relative difference of the wavefront of the aspherical lens 17 to be inspected with respect to the reference aspherical lens 27 is interference fringe information and formed on the image pickup place of the interferometer CCD camera 31. At this time, the reflection light sent from the lens 17 and that of the lens 27 are combined with each other and the shape of the aspherical lens 17 to be inspected with respect to the shape of the reference aspherical lens 27 is found as the interference fringe information.

The reflection light sent from the aspherical lens 17 to be inspected holds shape difference information based on a shape difference between the surface of the aspherical lens 17 to be inspected and the first basis spherical surface 15a. On the other hand, the reflection light sent from the reference aspherical lens 27 holds shape difference information based on a shape difference between the surface of the reference aspherical lens 27 and the second basis spherical surface 25a. Therefore, interference fringes formed by the interference of both rays of reflection light are based on difference information between the two pieces of shape difference information. Due to the foregoing, the fringe sensitivity may be greatly reduced. Therefore, it becomes possible to simultaneously obtain the shapes of all effective regions.

Accordingly, as compared with the conventional interference fringe shape measurement of measuring the aspherical optical element in which it is necessary to combine the pieces of interference fringe information after the interference fringe information of each region of the body to be inspected has been partially found, the measurement and analysis time may be greatly reduced. Further, the analysis software may be made simple. Accordingly, the measurement cost may be reduced.

The apparatus of the present exemplary embodiment is composed into the Michelson type in which an equal optical passage length type may be built. Since a difference in the optical passage length, which is generated when the luminous flux passes in the beam splitter 13, is compensated by using the compensating plate 14, the output light outputted from the light source 11 may be made into the low coherent light. Due to the foregoing, it is possible to avoid the generation of noise interference fringes based on the reflection light sent from other optical surfaces in the optical passage.

The compensating plate 14 is made of the same glass material as that of the beam splitter 13. Therefore, the refractive index and the dispersion value are the same as those of the beam splitter 13. The shape is also the same. However, the refractive index, the dispersion value, and the shape of the compensating plate 14 may not necessarily coincide with those of the beam splitter 13. The important point is to compensate a difference between the optical path lengths of both the optical paths generated when the beam splitter 13 is inserted into the optical path.

Figure 2:
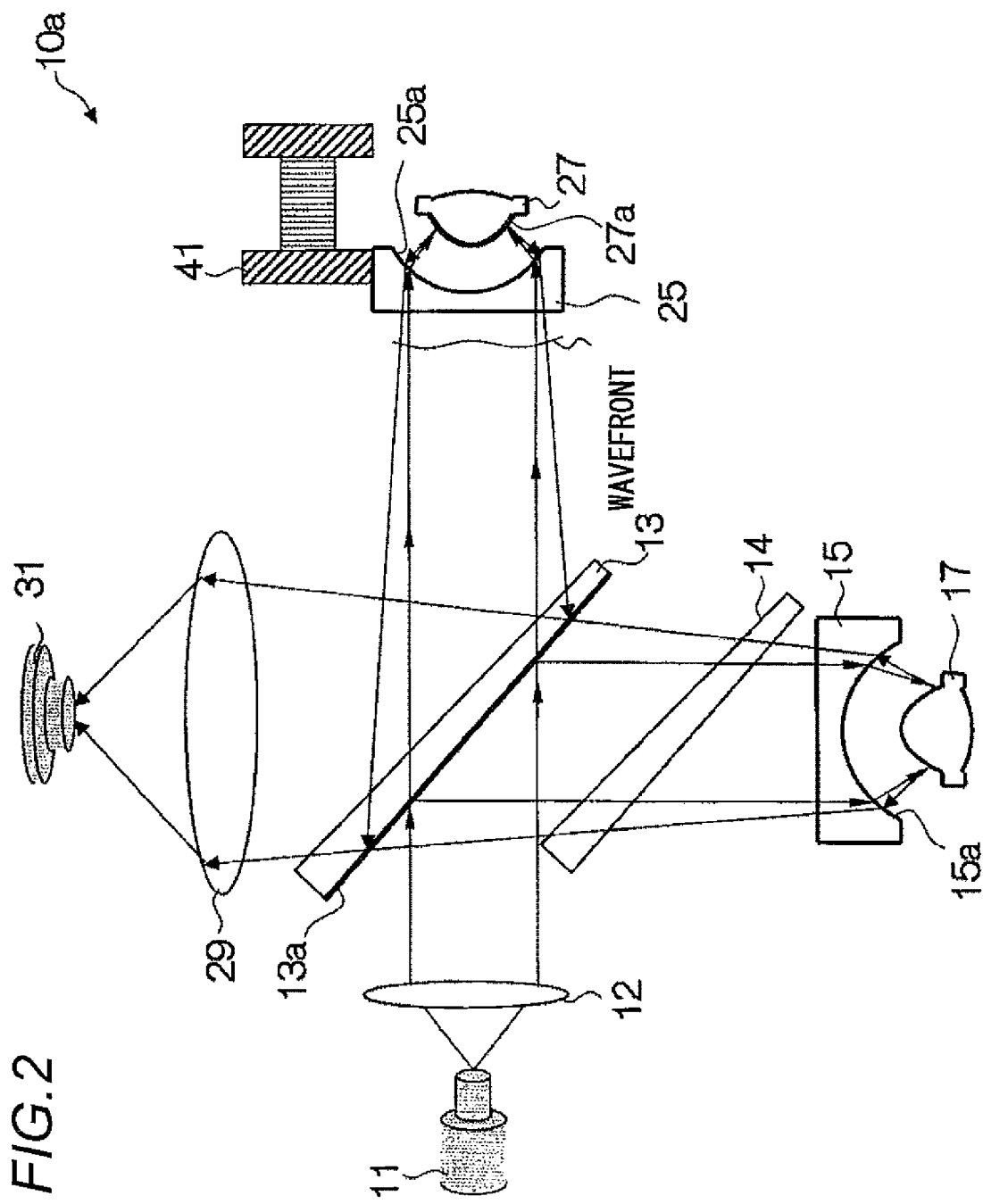
FIG. 2 is a view showing an outline of the constitution of a light wave interferometer apparatus of the second exemplary embodiment of the present invention.

FIG. 2 is a view showing an outline of the constitution of a light wave interferometer apparatus of a second exemplary embodiment of the present invention.

The apparatus 10a shown in FIG. 2 is substantially the same as the apparatus 10 shown in FIG. 1 in the fundamental constitution. Like reference marks are used to indicate like parts in FIG. 1 and the detailed explanations are omitted here.

As compared with the apparatus 10 shown in FIG. 1, in the apparatus 10a shown in FIG. 2, the deformable mirror 27a is attached onto a surface of the reference aspherical lens 27, for example, the attachment is adhesion.

The deformable mirror 27a is a reflection type optical modulating device. It is possible for the deformable mirror 27a to change a spatial optical phase distribution by an electric signal. That is, positions and inclinations of a large number of mirror devices may be changed when the applied voltage is changed. It is also possible to deform a curved surface formed out of a large number of mirror devices. When an electric signal, which is changed with the lapse of time, is inputted into the deformable mirror 27a described above, it is possible to deform a surface shape of the reference aspherical lens 27 by a small amount so that the surface shape of the reference aspherical lens 27 may become an ideal basis shape. Due to the foregoing, without machining the reference aspherical lens 27 with high accuracy, it is possible to form the reference aspherical lens 27, the shape of which is an ideal basis shape.

In this connection, in FIG. 2, the wavefront is schematically drawn which holds shape difference information based on a shape difference between the surface of the reference aspherical lens 27 and the second basis spherical surface 25a.

The first and second exemplary embodiments of the present invention are explained above. However, it should be noted that the present invention is not limited to the above specific exemplary embodiments and that variations may be made.

For example, in the above exemplary embodiments, the measurement is made by using a low coherent luminous flux. Therefore, it becomes possible to obtain a highly accurate measurement result. However, the measurement may be made by using a high coherent luminous flux. In this case, it becomes unnecessary to make the optical path lengths of two optical paths in the optical system highly accurately coincide with each other. Accordingly, it becomes possible to simplify an adjustment of the optical system.

Figure 3:
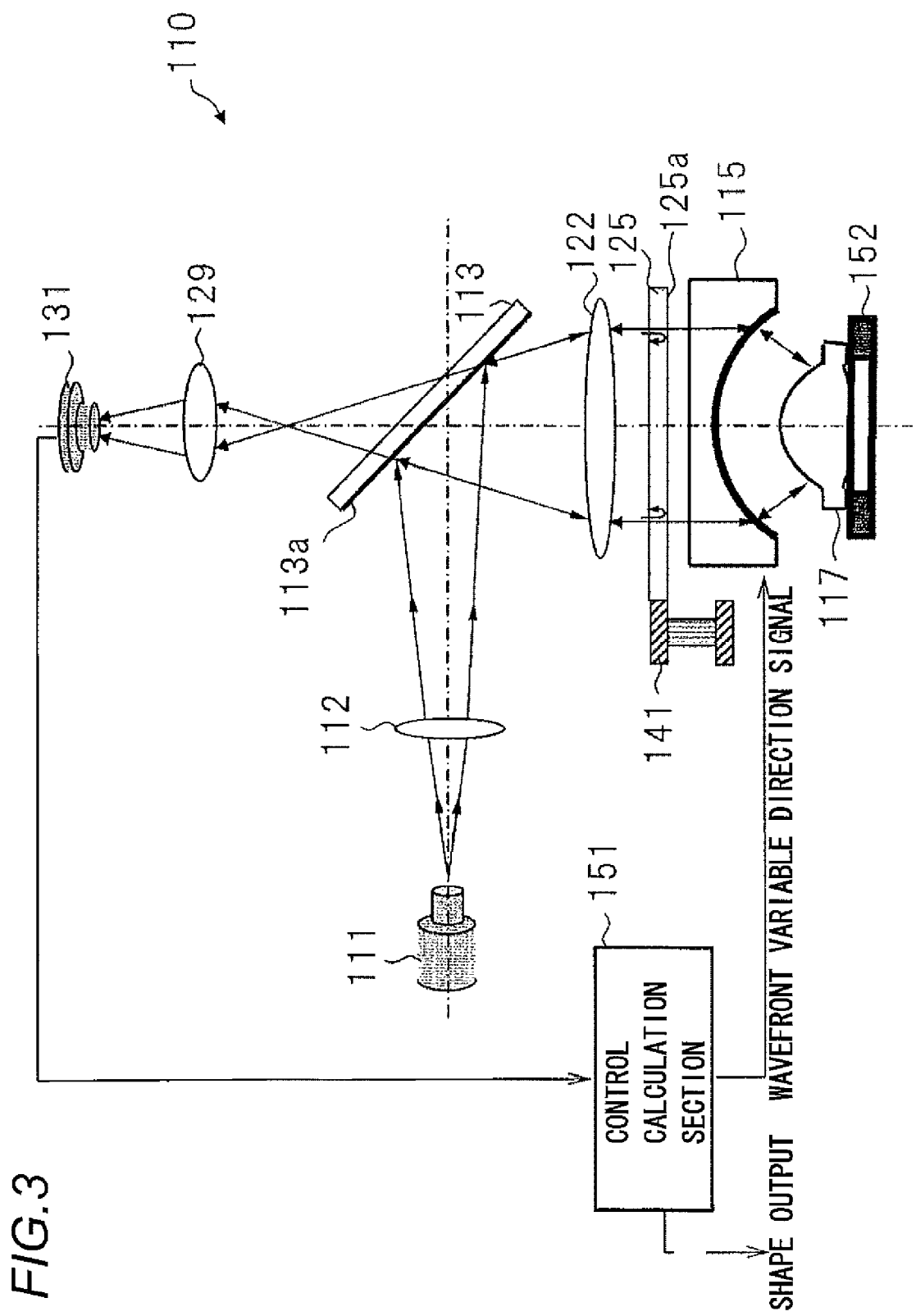
FIG. 3 is a view showing an outline of the constitution of a light wave interferometer apparatus of the third exemplary embodiment of the present invention.

FIG. 3 is a view showing an outline of the constitution of the light wave interferometer apparatus of a third exemplary embodiment of the present invention.

As shown in FIG. 3, this apparatus 110 is formed as a Fizeau type interferometer. This apparatus 110 includes:

a light source 111 for outputting a laser beam;

a lens 112 for adjusting convergence and divergence of a luminous flux sent from the light source 111;

a half mirror 113 having a half mirror surface 113a on which a portion of the luminous flux sent from the lens 112 is reflected;

a collimate lens 122 for forming the divergent luminous flux, which has been reflected on this half mirror 113, into a parallel luminous flux;

a basis plate 125 (a luminous flux separation and composition unit), on the basis surface 125a of which a portion of the parallel luminous flux sent from the collimate lens 122 is reflected and the remaining portion of the parallel luminous flux is transmitted;

a wavefront shape variable lens 115 which makes a luminous flux transmitting the basis surface 125a incident upon each surface position of a aspherical lens 117 to be inspected and returns an inspected light, which is reflection light sent from the aspherical lens 117 to be inspected, onto the half mirror surface 113a;

an interferometer CCD camera 131 which makes inspected light, which is reflection light sent from the aspherical lens 117 to be inspected, interfere with a reference light, which is reflection light sent form the basis surface 125a, on the basis surface 125a and picks up an image of interference fringes generated by this interference;

an image formation lens 129 for forming an image of interference fringes, which are generated by both rays of reflection light composed with each other, on an image pickup surface of the interferometer CCD camera 131; and a control calculation section 151.

In this case, the control calculation section 151 sends a wavefront variable direction signal, which will be referred to as a lens shape control signal hereinafter, to the wavefront shape variable lens 115 so that the interference fringes formed on an imaging body may become null fringes. In order to change a shape of the wavefront of the first luminous flux outputted from the wavefront shape variable lens 115, the control calculation section 151 has a wavefront shape variable lens adjustment function (a wavefront shape variable lens adjustment member) being capable of changing a refractive power distribution of the lens 115. Further, the control calculation section 151 has a lens shape calculating function (a lens shape calculating unit) for calculating an aspherical surface shape of the aspherical lens 117 to be inspected according to the wavefront variable direction signal which is sent to the wavefront shape variable lens 115 when the interference fringes have become the null fringes.

Only a primary portion of the wavefront shape variable lens 115 is schematically drawn. The wavefront shape variable lens 115 is composed so that a refractive power distribution may be changed according to the wavefront variable direction signal sent from the control calculation section 151 so as to adjust a wavefront of the output light.

The basis plate 125 is attached with the piezo element 141. Therefore, it is possible to employ a well known phase shift method.

The aspherical lens 117 to be inspected has a 5-axis-stage 152 being capable of being adjusted in the 5 axis directions (the directions of the X-axis, the Y-axis and the Z-axis axis and the directions round the X-axis and the Y-axis axis).

Next, operation of the apparatus of the present exemplary embodiment described above will be explained below. In this apparatus 110, a portion of the luminous flux sent from the light source 111 is reflected on the half mirror 113 and made to be a parallel luminous flux by the collimate lens 122 and then reflected on the basis plate 125. On the basis face 125a of the basis plate 125, a portion of the light is reflected as reference luminous flux and the remaining portion of the light is transmitted. The luminous flux, which has been transmitted through the basis face 125a, is incident upon the wavefront shape variable lens 115 and subjected to a refracting action so that the outputted luminous flux may be made to be incident upon each surface position on the aspherical lens 117 to be inspected by a desired angle. The above luminous flux is reflected on the aspherical lens 117 to be inspected and formed into the inspected light and returned to the basis face 125a described before. On the basis face 125a, this inspected light and the reference light interfere with each other and an image of the interference fringes generated by this interference is picked up by the interferometer CCD camera 131. The interference fringe information, the image of which has been picked up in this way, is inputted into the control calculation section 151. In order to make the interference fringes to be the null fringes, a lens shape control signal is outputted onto the wavefront shape variable lens 115. Due to the foregoing, feedback control is executed.

By this feedback control, a refracting force distribution of the wavefront shape variable lens 115 is changed and the outputted luminous flux is made to be perpendicularly incident upon each surface position of the aspherical lens 117 to be inspected. Due to the foregoing, the inspected light is perpendicularly reflected from each surface position and follows the optical path in which the light has come to each surface position before, and reaches the half mirror face 113a. At this time, a wavefront of the luminous flux outputted from the wavefront shape variable lens 115, that is, a refractive power distribution of the wavefront shape variable lens 115 is made to correspond to the surface shape of the aspherical lens 117 to be inspected. Accordingly, when it has become a state in which the luminous flux is perpendicularly incident at each surface position of the aspherical lens 117 to be inspected, according to the lens shape control signal outputted from the control calculation section 151 (the wavefront shape variable lens adjustment member) to the wavefront shape variable lens 115, a predetermined calculation is executed by the control calculation section 151 (the lens shape calculating unit) and an aspherical surface shape of the aspherical lens 117 to be inspected is calculated. In this connection, it is possible to calculate an aspherical surface shape of the aspherical lens 117 to be inspected according to a total of the lens shape control signal values from a point of time to a point of time when the interference fringes have become null fringes.

Next, explanations will be made into the specific constitution of the wavefront shape variable lens 115 described above. For example, the following two-liquid type lens element may be used as the wavefront shape variable lens 115. Into a cylindrical container, both end surfaces in the optical axis direction of which are transparent, conductive water-soluble liquid and non-conductive oiliness liquid, the refractive indexes of which are different from each other, are charged. According to the applied voltage to the container, a boundary surface shape between the water soluble liquid and the oiliness liquid is changed by the surface tension, so that a refractive power distribution may be changed. It is possible to use this two-liquid type lens element. Specifically, for example, it is possible to use the Fluid Focus lens manufactured by Philips Co. of the Netherlands.

Other forms of the wavefront shape variable lens 115 are described as follows.

(a) A liquid crystal lens element, the refractive power distribution of which may be changed when a region is divided into concentrically circular regions formed round the optical axis and a characteristic of each divided region is changed according to a change in the applied voltage.

(b) A fine particle cataphoresis element capable of changing a refractive power distribution in such a manner that fine particle dispersion liquid, in which fine particles are dispersed in liquid, is interposed between two transparent mediums arranged in the optical axis direction and when a state of cataphoresis of the fine particles in the fine particle dispersion liquid is changed according to a changeover of the applied voltage to the fine particle dispersion liquid, the refractive index of the fine particle dispersion liquid is changed, so that a refractive power distribution may be changed.

(c) A liquid crystal lens element which is made of two mediums arranged in the optical axis direction adjacent to each other in which at least one of the two mediums is a liquid crystal element and when the refractive index of one liquid crystal region is changed according to a change in the applied voltage to the liquid crystal element, a refractive power distribution may be changed.

The third exemplary embodiment of the present invention is explained above. However, it should be noted that the present invention is not limited to the above specific exemplary embodiment and that variations may be made.

For example, in the above exemplary embodiment, the measurement is executed by using a laser beam luminous flux which is a high coherent luminous flux. However, for example, concerning the constitution of the apparatus, when the Michelson type apparatus of the equal optical path length type is employed and low coherent light is used for the light of the light source, interference fringes noise related to the other surface in the optical path may be eliminated.

The body to be inspected is not limited to the above aspherical lens. Of course, it is possible to use the apparatus for measuring a spherical lens. For example, the apparatus may be applied to a surface shape such as a spherical surface, an aspherical surface or a free curved surface of the optical element except for the lens such as a reflection mirror.

What is claimed is:

1. A light wave interferometer apparatus comprising:
a luminous flux separation and composition unit that separates a luminous flux sent from a light source into two of a first luminous flux going in a direction of a measured sample having a surface shape to be measured and a second luminous flux going in a direction of a reference sample and composes a light of the first luminous flux returning from the measured sample with a light of the second luminous flux returning from the reference sample so as to generate an interference light which forms an interference fringe image on an imaging body arranged at a position based on information of a surface shape of the measured sample;
a first basis spherical lens arranged between the luminous flux separation and composition unit and the measured sample and having a first basis spherical surface opposed to the measured sample, the first basis spherical lens making the first luminous flux from the luminous flux separation and composition unit incident on a surface of the measured sample and returning the first luminous flux reflected on the surface of the measured sample to the luminous flux separation and composition unit; and
a second basis spherical lens arranged between the luminous flux separation and composition unit and the reference sample and having a second basis spherical surface opposed to the reference sample, wherein a radius of curvature of the second basis spherical surface is the same as that of the first basis spherical surface, the second basis spherical lens making the second luminous flux from the luminous flux separation and composition unit incident on a surface of the reference sample and returning the second luminous flux reflected on the surface of the reference sample to the luminous flux separation and composition unit, wherein the measured sample is an aspherical optical element, and the reference sample is an aspherical optical element and has a reference shape of the measured sample.

2. The light wave interferometer apparatus according to claim 1, wherein the light wave interferometer apparatus is a Michelson type interferometer apparatus, wherein optical path lengths of the first luminous flux and the second luminous flux are substantially equal to each other.

3. The light wave interferometer apparatus according to claim 1, wherein the luminous flux separation and composition unit has a separation surface on one side thereof, which separates and composes the first and second luminous fluxes by a reflection and a transmission of the first and second luminous fluxes and, wherein the luminous flux separation and composition unit has a plate shape, a cross-section of which has a wedge shape.

4. The light wave interferometer apparatus according to claim 3, further comprising:

a compensating plate that compensates a difference in optical path length between the first luminous flux and the second luminous flux, and which is positioned in an optical path of one of the first or the second luminous fluxes emitted onto one side of the luminous flux separation and composition unit and positioned between the one of the basis spherical lens and the luminous flux separation and composition unit in the optical path.

5. The light wave interferometer apparatus according to claim 1, further comprising:

a deformable mirror attached onto a surface of the reference sample.

* * * * *